Patented Nov. 21, 1922.

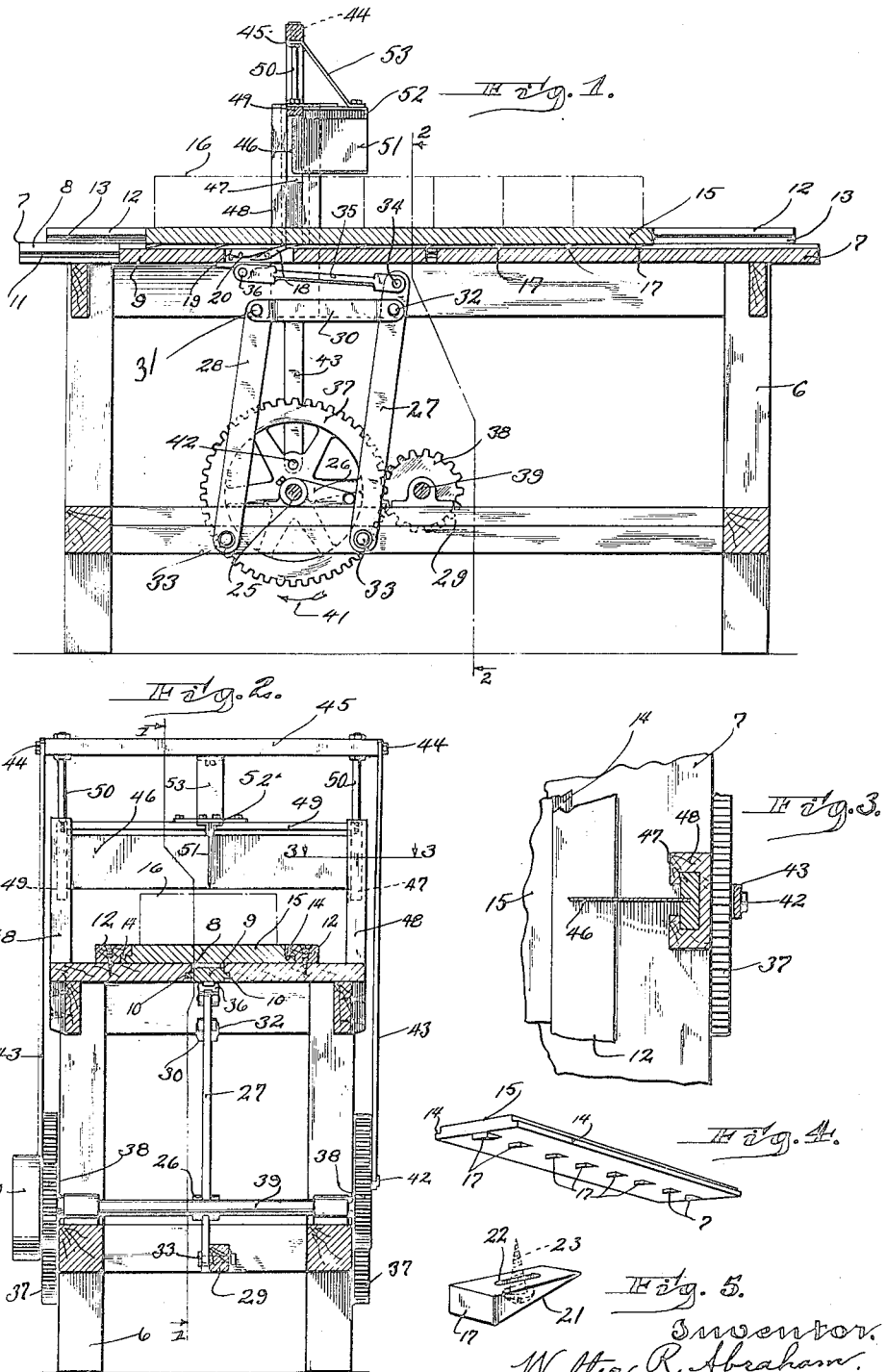

1,436,001

UNITED STATES PATENT OFFICE.

WALTER R. ABRAHAM, OF OSHKOSH, WISCONSIN.

ICE-CREAM-BRICK-CUTTING MACHINE.

Application filed March 13, 1920. Serial No. 365,407.

*To all whom it may concern:*

Be it known that I, WALTER R. ABRAHAM, a citizen of the United States, and resident of Oshkosh, in the county of Winnebago and State of Wisconsin, have invented new and useful Improvements in Ice-Cream-Brick-Cutting Machines, of which the following is a description, reference being had to the accompanying drawings, which are a part of this specification.

The present invention relates to certain new and useful improvements in ice cream brick cutting machines and has for one of its objects to provide such a machine capable of adjustment to vary the size of the bricks cut thereby.

Another object of this invention is to provide a power driven ice cream cutting machine in which the cream to be cut is automatically fed past the cutting members upon the completion of each cutting stroke thereof.

A further object of this invention resides in the provision of an improved form of cutting member, capable of forming two ice cream bricks in one operation.

A still further object of the present invention resides in the provision of an improved adjustable ice cream feed platform, whereby ice cream to be cut is given a step by step movement toward the cutting member to form the same into bricks.

With the above and other objects in view which will appear as the description proceeds my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawing I have illustrated one complete example of the physical embodiment of my invention constructed according to the best mode I have so far devised for the practical application of the principles thereof, and in which:

Fig. 1 is a view, part in section and part in elevation taken on the plane indicated by the line 1—1 of Fig. 2.

Fig. 2 is a view taken transversely through the machine on the line 2—2 of Fig. 1.

Fig. 3 is a fragmentary view, part in section and part in elevation taken on the line 3—3 of Fig. 2.

Fig. 4 is a perspective view of my improved form of ice cream feed platform, and Fig. 5 is a perspective view of one of the improved adjustable feed lugs carried by the feed platform.

Referring now more particularly to the accompanying drawing the numeral 6 designates generally a frame member having a table top 7 provided with a central longitudinally extending recess 8 in which is slidably mounted a reciprocating bar 9, the bar 9 having side ribs or flanges 10 slidably mounted within guideways 11 formed in the side walls of the recess 8.

Secured to the table top 7 parallel with the recess 8 are two spaced guide members 12 forming guide grooves 13 in which are slidably mounted the side longitudinal edges 14 of a feed platform 15, upon which is mounted the ice cream 16 which is to be cut into a plurality of blocks. The platform 15 has its portion in line with the recess 8 provided with a plurality of lugs or cam surfaces 17 which are adapted to be engaged by means of a feed pawl or dog 18 pivotally mounted within a recess 19 in the slide 9, and having a spring 20 normally yieldingly urging the same against the underside of the platform 15. As best shown in Fig. 1 the cam face 21 of each projection 17 is inclined away from the normal direction of movement of the platform 15, so that the pawl 18 will cam over each projection when the slide 9 is on its backward movement.

Slide 9 is reciprocated by means to be later described and as the slide always advances substantially the same distance, I provide means for adjusting the advancement of the feed platform 15 by forming each lug 17 with an elongated recess 22 through which a securing screw member 23 passes, the lugs 17 being secured in different positions with respect to each other to vary the feed of the platform 15 as will be obvious. The closer the lugs 17 are together, the smaller the blocks of cream and vice versa.

The slide 9 is reciprocated from a shaft 25 transversely journalled in the frame 6 and having a crank arm 26 secured thereto and selectively engageable with levers 27 and 28 forming, with a longitudinal frame beam 29 and a link member 30, a parallelogram. The link member has one end pivoted, as at 31, to the upper end of lever 28 and the other end of said link member is pivoted, as at 32, to the lever 27 adjacent its upper end, the lever 27 being slightly longer than the lever 28 and both of said levers having their lower ends pivoted, as at 33, to the beam 29.

The extreme upper end of the lever 27 has pivoted thereto, as at 34, one end of a link member or connecting rod 35 having its other end pivotally connected, as at 36, to the slide 9. The shaft 25 has a gear 37 secured thereto and in mesh with a pinion gear 38 carried by a drive shaft 39 adapted to be driven through pulley 40 from any desired source of power (not shown).

The shaft 25 is rotated in the direction of the arrow 41, Fig. 1, and when the outer end of crank 26 engages the lever 27, the same will be moved to the right with reference to Fig. 1 and the slide 9 and platfrom 15 be given a corresponding movement, and when the crank arm engages lever 28 a reverse movement will be imparted to the slide 9, but the platform 15 will remain stationary as the pawl 18 will ride over the next projection 17.

A cutting member, now about to be described, is passed into and out of the cream 16 during the movement of the arm 26 from its position disengaging lever 27 to its position about to engage said lever, or in other words, while the platform is stationary.

As best shown in Fig. 2, two of the gears 37 are employed and have secured thereto alined crank pins 42 to which are pivoted the lower ends of connecting rods or pitmen 43, having their upper ends pivotally fixed, as at 44, to a transverse bar 45 connected with the cutter proper.

The cutting member comprises a blade 46 having its ends secured in vertical side members 47 slidably mounted within vertical guides 48 secured to opposite sides of the table 7. The sides 47 are connected by a transverse top frame 49 and are also connected to the bar 45 by brace rods 50.

The blade 46 makes a transverse cut in the cream and in order to form two bricks in one cutting portion, an intermediate blade 51 is projected forwardly from the blade 46 intermediate its ends to make a longitudinal cut. The blade 51 has its rear end firm against the blade 46, and may be secured thereto, and has its upper end secured in a frame portion 52 of angle iron and is braced by a diagonal member 53 connected with the frame 52 near its outer end and to the transverse bar 45.

The movement of the platform 15, as before stated, is timed with the movement of the cutting member so that the blades 46 and 51 are passed into the cream 16 immediately upon the reaching of the slide 9 and platform 15 to their full advanced position, when the same is reciprocated and reaches a point in its upper movement just out of the cream when the crank 26 is about to engage the lever 27 to again advance the platform 15, as will be obvious. Thus it will be readily apparent that the feed of the cream to the cutters is automatic and that I provide a machine which is capable of rapid operation and which will be efficient and capable of adjustment to cut blocks of any desired size or weight.

What I claim as my invention is:

1. A device of the class described comprising a supporting frame, a material receiving table slidably carried by the frame, a cutter mounted on said frame for cutting the material thereon into blocks, and means for reciprocating said table and including a pair of levers having their adjacent ends pivotally connected to form a parallelogram, means connecting one of said levers with said table, a drive shaft journally mounted intermediate said levers, and a crank member carried by said shaft and engageable with said levers to oscillate the same.

2. A device of the class described comprising a supporting frame, a material receiving table slidably carried by the frame, a pair of levers having their lower ends pivotally secured to the frame in spaced relation, a link pivotally connecting the upper ends of said levers and forming therewith and with this frame a parallelogram, means connecting the upper end of one lever with said table, a drive shaft journally mounted intermediate said levers, crank means carried thereby and selectively engageable with said levers to advance the table step by step, and means for cutting the material on the table after each advance.

3. A device of the class described comprising a supporting frame, a material receiving table slidably carried by the frame, a pair of levers having their lower ends pivotally secured to the frame in spaced relation, a link pivotally connecting the upper ends of said levers and forming therewith and with this frame a parallelogram, means connecting the upper end of one lever with said table, a drive shaft journally mounted intermediate said levers, crank means carried thereby and selectively engageable with said levers to advance the table step by step, a cutter mounted above the table, and means connecting said cutter with the drive shaft and timed to pass the same through and out of the material thereon during the time said crank means disengages one lever until it engages the same again.

In testimony whereof, I affix my signature.

WALTER R. ABRAHAM.